(12) United States Patent
Wang et al.

(10) Patent No.: US 7,699,227 B2
(45) Date of Patent: Apr. 20, 2010

(54) OPTICAL READER

(75) Inventors: Ynjiun P. Wang, Cupertino, CA (US);
William H. Havens, Syracuse, NY (US)

(73) Assignee: Hand Held Products, Inc., Skaneateles Falls, NY (US)

(*) Notice: Subject to any disclaimer, the term of this patent is extended or adjusted under 35 U.S.C. 154(b) by 588 days.

(21) Appl. No.: 11/545,794

(22) Filed: Oct. 10, 2006

(65) Prior Publication Data

US 2007/0164111 A1    Jul. 19, 2007

Related U.S. Application Data

(60) Provisional application No. 60/759,103, filed on Jan. 13, 2006.

(51) Int. Cl.
*G06K 7/10*    (2006.01)

(52) U.S. Cl. .......... 235/454; 235/462.01; 235/462.09; 235/462.11; 235/462.14; 235/462.23; 235/462.24; 235/462.45; 235/462.49; 235/472.01; 235/472.02; 235/472.03

(58) Field of Classification Search .......... 235/454, 235/462.24, 462.4, 462.2, 462.01, 462.09, 235/462.11, 462.14, 462.23, 462.45, 462.49, 235/472.01–472.03
See application file for complete search history.

(56) References Cited

U.S. PATENT DOCUMENTS

| | | | |
|---|---|---|---|
| 6,290,135 B1* | 9/2001 | Acosta et al. | 235/472.01 |
| 6,340,114 B1* | 1/2002 | Correa et al. | 235/462.22 |
| 6,622,915 B2* | 9/2003 | Ishikawa | 235/454 |
| 2002/0158127 A1* | 10/2002 | Hori et al. | 235/454 |
| 2005/0011952 A1* | 1/2005 | Krichever | 235/454 |

* cited by examiner

*Primary Examiner*—Thien M. Le
*Assistant Examiner*—Tuyen K Vo
(74) *Attorney, Agent, or Firm*—Hiscock & Barclay, LLP

(57) ABSTRACT

An optical reader comprising: an image sensor array for converting light from a target into output signals representative thereof, the image sensor array having a centerline; a processor for decoding a machine readable symbology within the target derived from the output signals; receive optics for directing light from the target to the image sensor, the optics having a receive optics optical axis, wherein the image sensor array and receive optics are configured such that the centerline is not coincident with the optical axis.

19 Claims, 17 Drawing Sheets

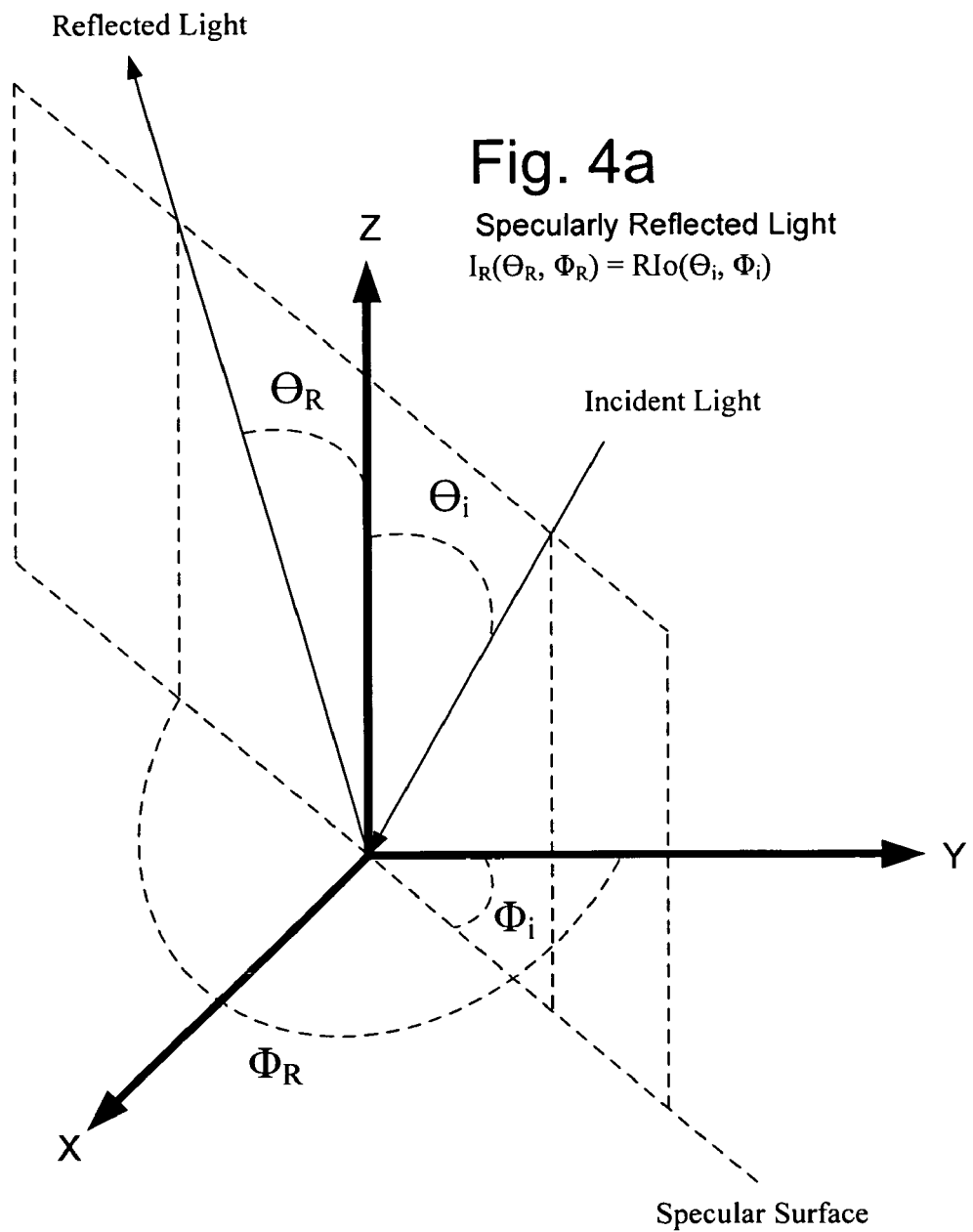

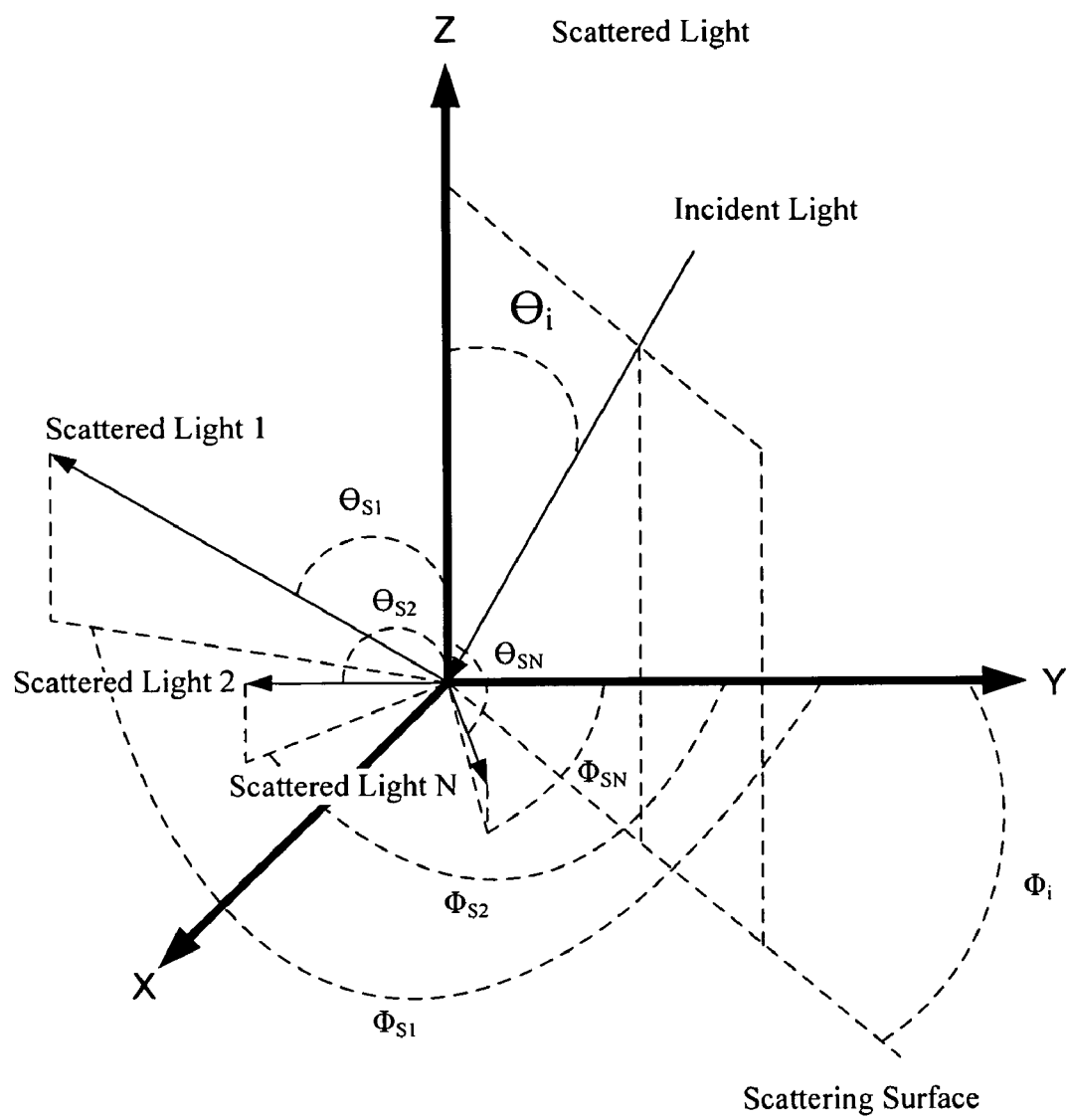

Front View

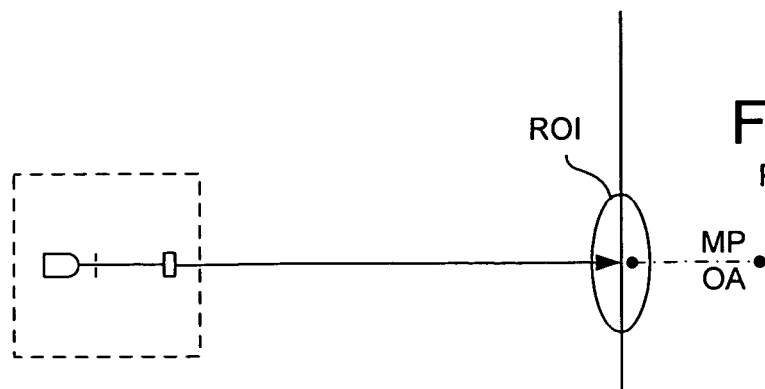
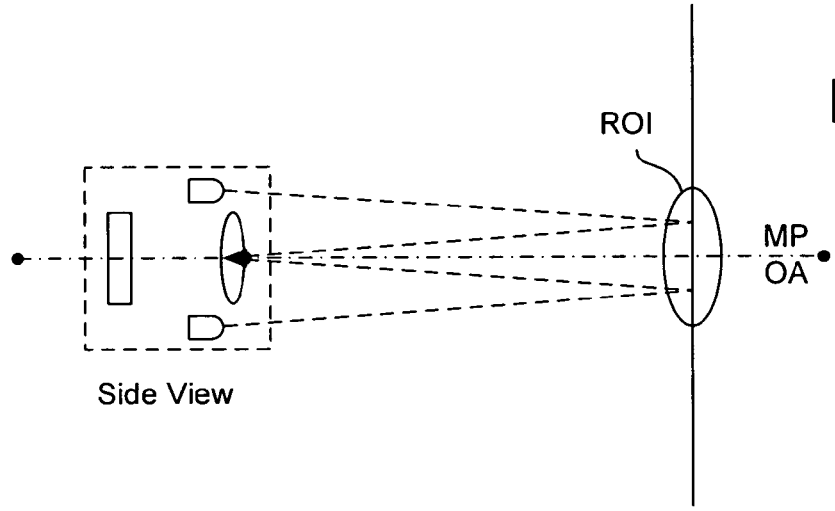
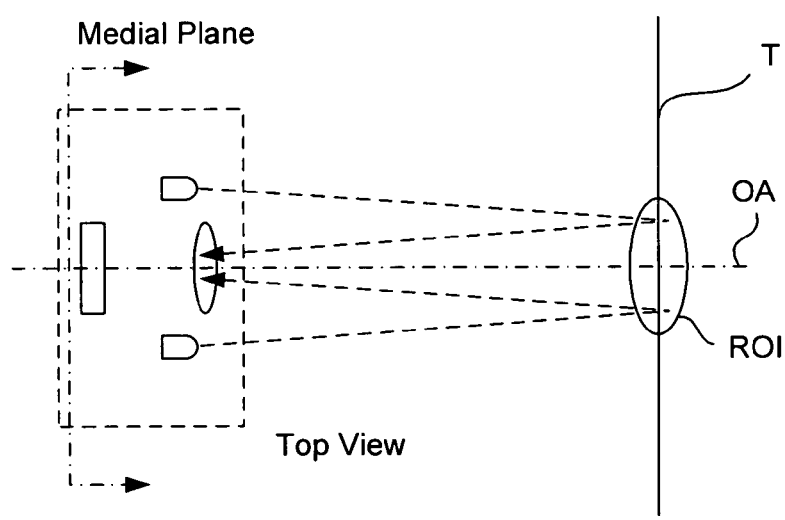

Front View

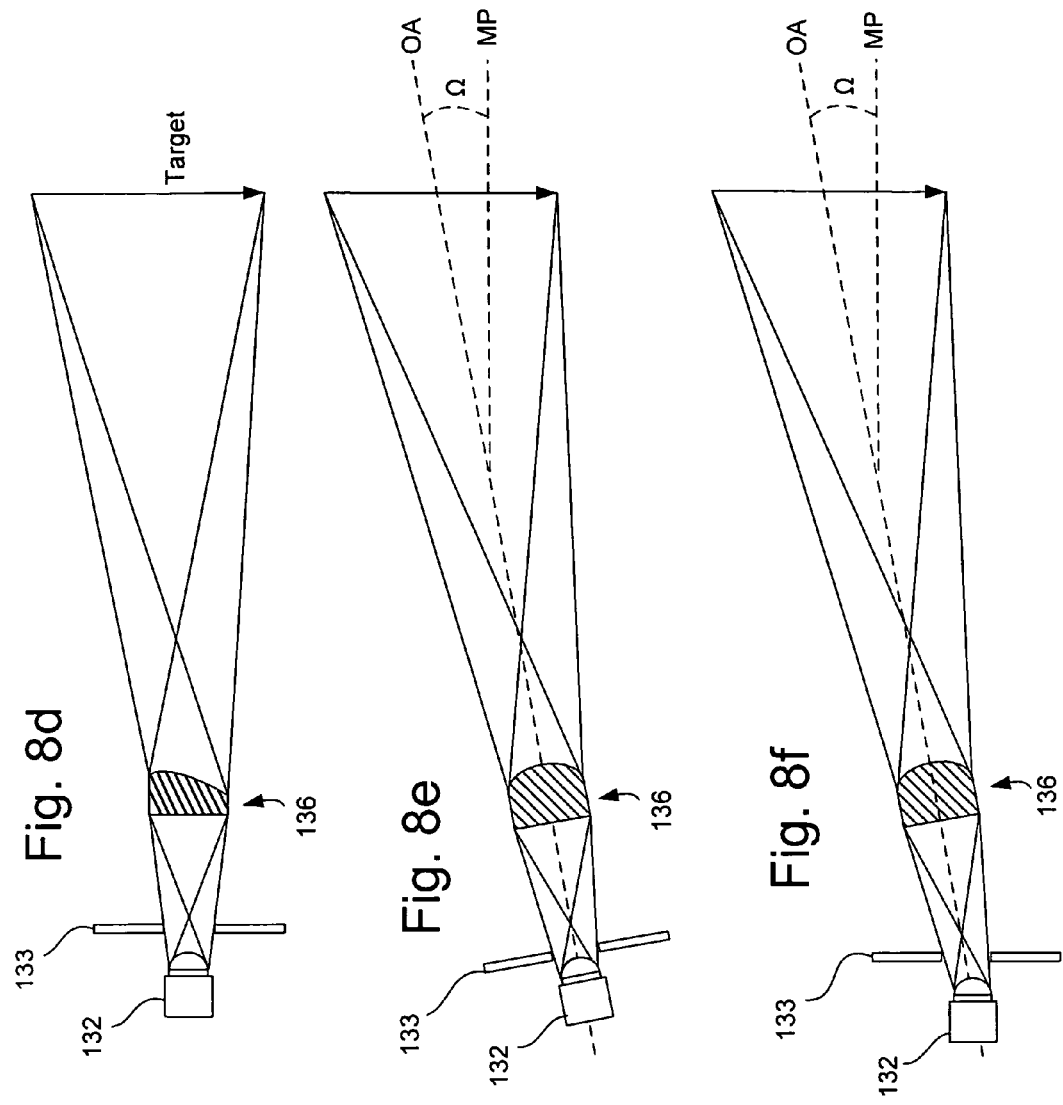

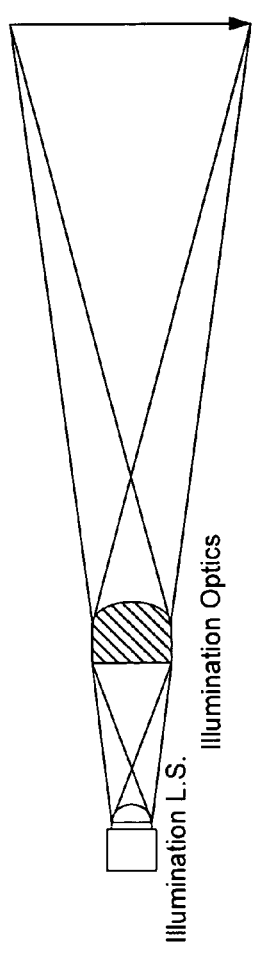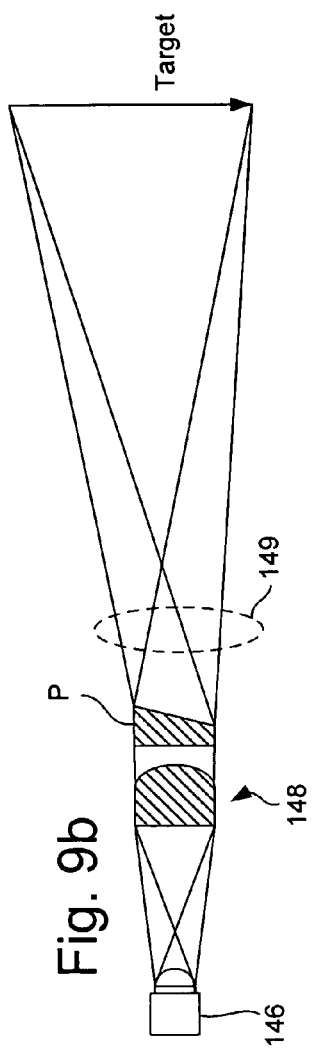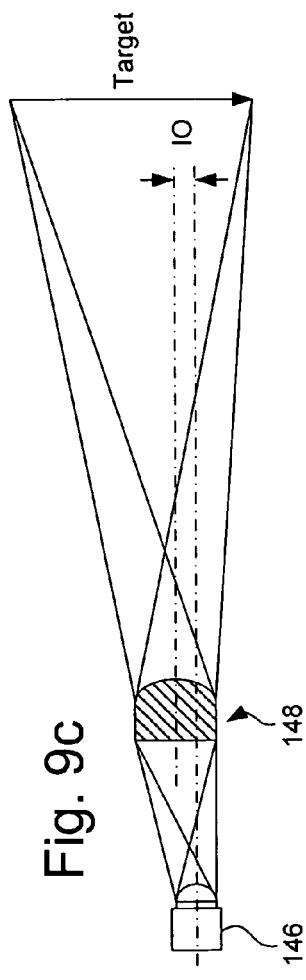

OPTICAL READER

RELATED APPLICATIONS

This application claims the priority date of U.S. Provisional Application Ser. No. 60/759,103 entitled "Optical Reader with Specular Reflection Reduction", filed on Jan. 13, 2006

FIELD OF THE INVENTION

The present invention relates to optical reading devices, and more particularly to an optical reading device that redirects illumination for reduction of specular reflection.

BACKGROUND

Optical reading devices typically read data represented by symbols. For instance one type of a bar code symbol is an array of rectangular bars and spaces that are arranged in a specific way to represent elements of data in machine readable form. Optical reading devices typically transmit light onto a symbol and receive light scattered and/or reflected off of a bar code symbol. The received light is interpreted to extract the data represented by the symbol.

One-dimensional (1D) optical bar code readers are characterized by reading data that is encoded along a single axis, in the widths of bars and spaces, so that such symbols can be read from a single scan along that axis, provided that the symbol is imaged with a sufficiently high resolution along that axis.

In order to allow the encoding of larger amounts of data in a single bar code symbol, a number of 1D stacked bar code symbologies have been developed which partition encoded data into multiple rows, each including a respective 1D bar code pattern, all or most all of which must be scanned and decoded, then linked together to form a complete message. Scanning still requires relatively high resolution in one dimension only, but multiple linear scans are needed to read the whole symbol.

A class of bar code symbologies known as two dimensional (2D) matrix symbologies have been developed which offer greater data densities and capacities than 1D symbologies. 2D matrix codes encode data as dark or light data elements within a regular polygonal matrix, accompanied by graphical finder, orientation and reference structures.

Often times an optical reader may be portable and wireless in nature thereby providing added flexibility. In these circumstances, such readers form part of a wireless network in which data collected within the terminals is communicated to a host computer situated on a hardwired backbone via a wireless link. For example, the readers may include a radio or optical transceiver for communicating with a network computer.

Conventionally, a reader, whether portable or otherwise, may include a central processor which directly controls the operations of the various electrical components housed within the bar code reader. For example, the central processor controls detection of keyboard entries, display features, wireless communication functions, trigger detection, and bar code read and decode functionality.

Efforts regarding such systems have led to continuing developments to improve their versatility, practicality and efficiency.

BRIEF DESCRIPTION OF THE DRAWINGS

FIG. 4a is an illustration of specularly reflected light.

FIG. 4b is an illustration of scattered light.

FIG. 6b is a schematic block diagram of a side view of a prior art optical reader system illustrating an aiming light beam.

FIG. 6c is a schematic block diagram of a side view of a prior art optical reader system illustrating single beam components of illumination light specularly reflected off a target.

FIG. 6d is a schematic block diagram of a top view of a prior art optical reader system illustrating single beam components of illumination light specularly reflected off a target.

FIGS. 8b-8f are schematic diagrams of exemplary aiming pattern generator systems in accordance with the present invention.

FIG. 9a is a schematic diagram of an illumination generator system in accordance with the prior art.

FIGS. 9b-9c are schematic diagrams of exemplary illumination generator systems in accordance with the present invention.

DETAILED DESCRIPTION

Reference will now be made to exemplary embodiments of the invention which are illustrated in the accompanying drawings. This invention, however, may be embodied in various forms and should not be construed as limited to the embodiments set forth herein. Rather, these representative embodiments are described in detail so that this disclosure will be thorough and complete, and will fully convey the scope, structure, operation, functionality, and potential of applicability of the invention to those skilled in the art. Wherever possible, the same reference numbers will be used throughout the drawings to refer to the same or like parts. The term "scan" or "scanning" use herein refers to reading or extracting data from an information bearing indicia or symbol.

An exemplary optical reader system in accordance with the invention may be adapted for reading symbol indicia for numerous functions. A detailed description of transaction terminals and their operation is disclosed in commonly owned published United States Patent Application Publication No. 20030029917 entitled OPTICAL READER FOR IMAGING MODULE and United States Patent Application Publication No. 20030019934 entitled OPTICAL READER AIMING ASSEMBLY COMPRISING APERTURE, United States Patent Application Publication No. 20040134989 entitled DECODER BOARD FOR AN OPTICAL READER UTILIZING A PLURALITY OF IMAGING FORMATS which are hereby incorporated herein by reference.

Figure 1:
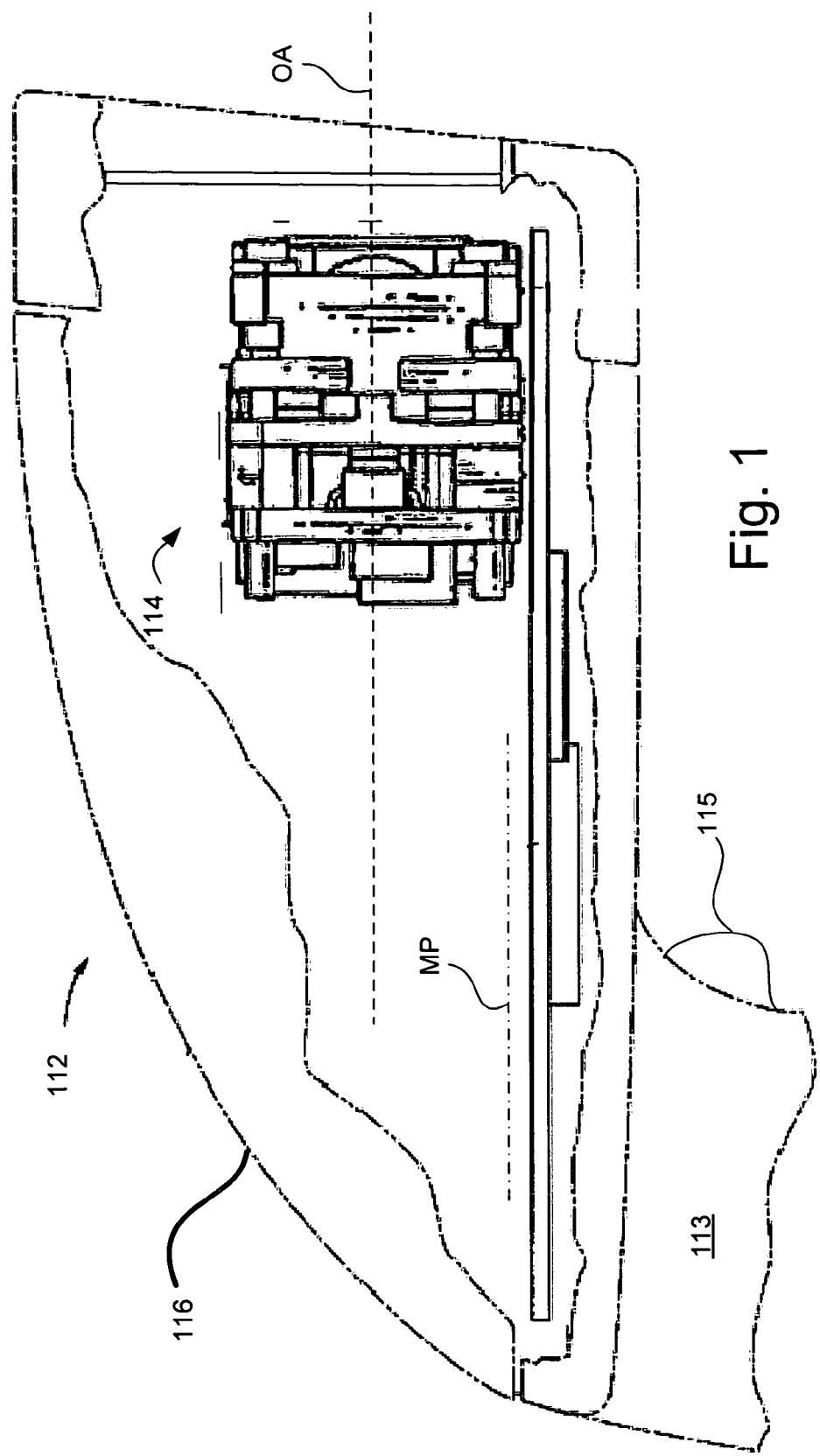
FIG. 1 is a fragmentary partially cutaway side view of an exemplary reader in accordance with the invention.
Figure 2:
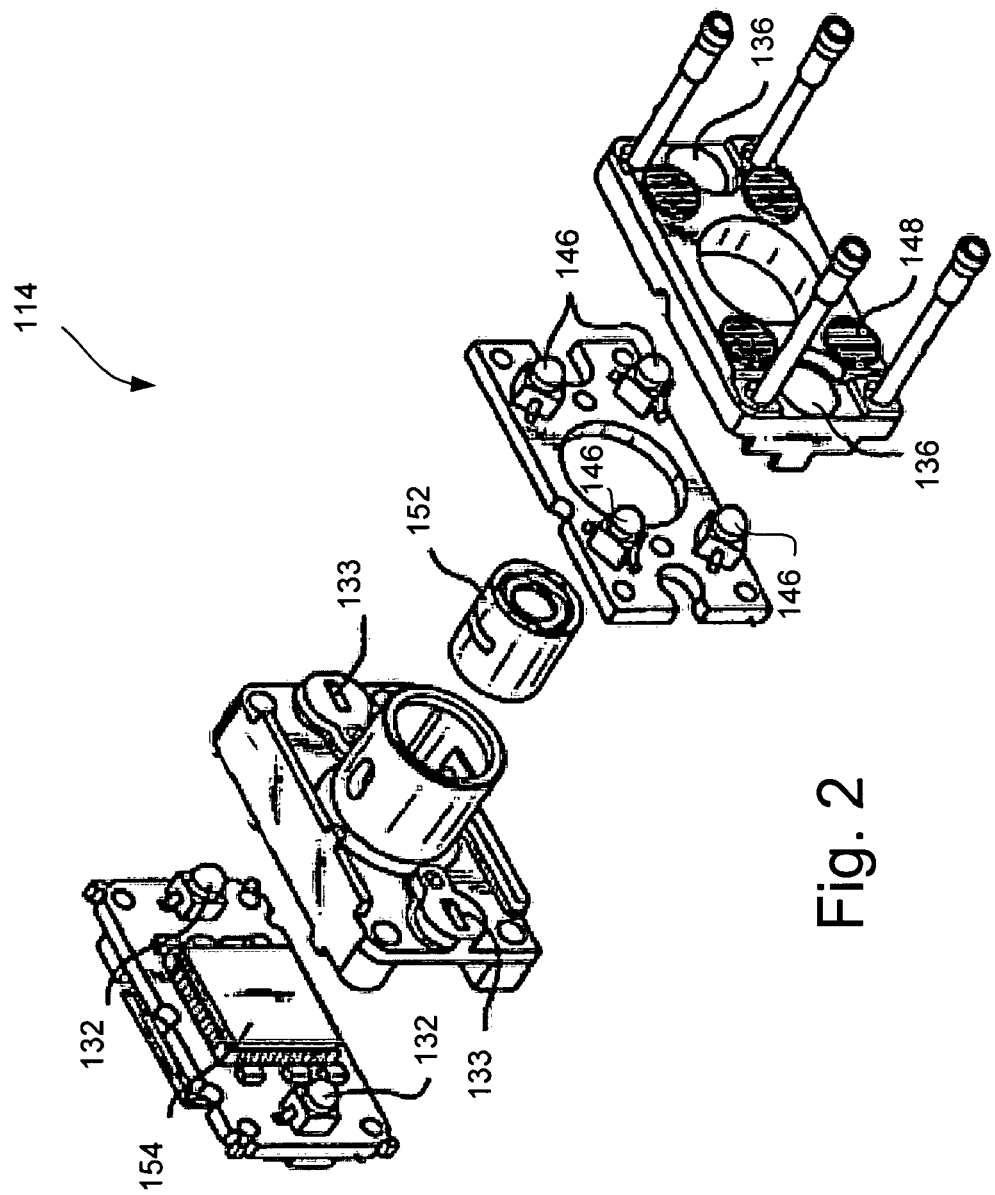
FIG. 2 is a perspective assembly view of an exemplary imaging module in accordance with the invention.
Figure 3:
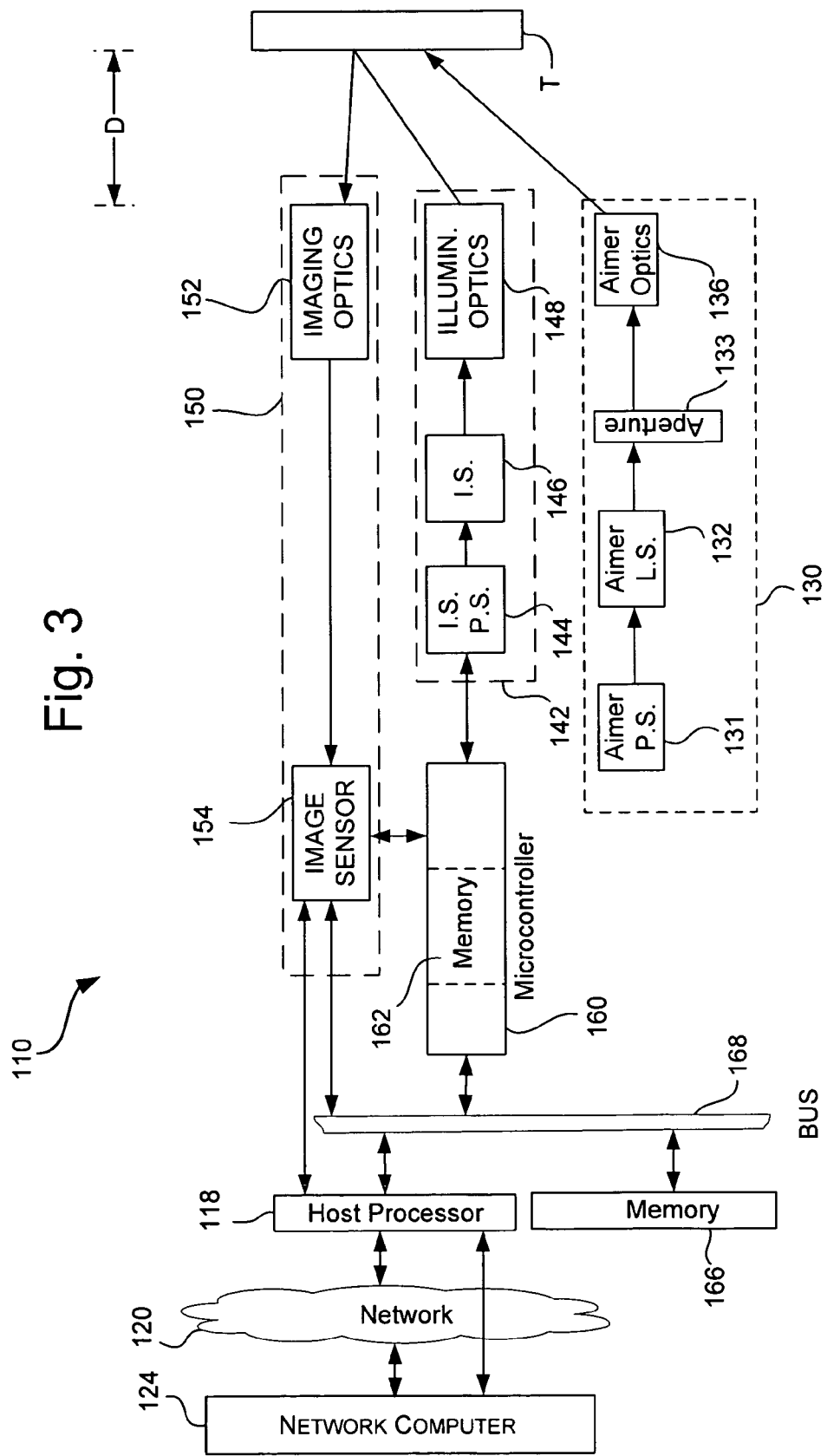
FIG. 3 is a block schematic diagram of an exemplary optical reader in accordance with the invention.

Referring to FIGS. 1, 2 and 3, an exemplary optical or indicia reader 112 which may have a number of subsystems for capturing and reading images, some of which may have symbol indicia provided therein. Reader 112 may have an imaging reader assembly 114 (including an image sensor 154) provided within a head portion or housing 116 which may be configured to be hand held by a handle portion 113. A trigger 115 may be used to control operation of the reader 112. The head portion 116 may have a medial plane MP selected so that when the hand-held imager is held with the head portion generally in a horizontal plane, the medial plane MP will generally be perpendicular to the face of the scanning head 116. Generally operators have a tendency to hold the medial plane of the head portion of the imager approximately normal to the plane of the target when collecting data. Image reader assembly 114 has imaging reader imaging optics having an optical axis (OA) for receiving light reflected off of a target T. The optical axis is a line of symmetry through the imaging optics. The target may be any object or substrate which may bear a 1D or 2D bar code symbol or text or other machine readable indicia.

A trigger 115 may be used for controlling full or partial operation of the reader 112. Imaging reader assembly 114 may also have an aiming generator light source 132, aiming aperture 133, aiming optics 136, an illumination source 146, illumination optics 148 and imaging optics 152.

Illumination and aiming light sources with different colors may be employed. For example, in one such embodiment the image reader may include white and red LEDs, red and green LEDs, white, red, and green LEDs, or some other combination chosen in response to, for example, the color of the symbols most commonly imaged by the image reader. Different colored LEDs may be each alternatively pulsed at a level in accordance with an overall power budget.

An exemplary imaging system 110 may include a reader 112 in communication with a host processor 118. This host processor may be in communication with a network 120 which may be connected to one or more network computers 124. Reader 112 may include a number of components, such as an aiming pattern generator 130 adapted to generate an aiming pattern for assisting an operator to align target T coincident with the field of view of an imaging subassembly 150.

Aiming pattern generator 130 may include a power supply 131, light source 132, aperture 133 and optics 136 to create an aiming light pattern projected on or near the target which spans a portion of the receive optical system 150 operational field of view with the intent of assisting the operator to properly aim the scanner at the bar code pattern that is to be read. A number of representative generated aiming patterns are possible and not limited to any particular pattern or type of pattern, such as any combination of rectilinear, linear, circular, elliptical, etc. figures, whether continuous or discontinuous, i.e., defined by sets of discrete dots, dashes and the like.

Generally, the aiming light source(s) 132 may comprise any light source to provide a desired illumination pattern at the target and may be one or more LEDs, such as part number NSPG300A made by Nichia Corporation.

The light beam from the LEDs 132 may be directed towards an aperture 133 located in close proximity to the LEDs. An image of this back illuminated aperture 133 may then be projected out towards the target location with a lens 136. Lens 136 may be a spherically symmetric lens, an aspheric lens, a cylindrical lens or an anamorphic lens with two different radii of curvature on their orthogonal lens axis.

Alternately, the aimer pattern generator may be a laser pattern generator. The light sources 132 may also be comprised of one or more laser diodes such as those available from Rohm. In this case a laser collimation lens (not shown) will focus the laser light to a spot generally forward of the reader and approximately at the plane of the target T. This beam may then be imaged through a diffractive interference pattern generating element, such as a holographic element fabricated with a desired pattern. Examples of these types of elements may be available for example, from Digital Optics Corp. of Charlotte, N.C. among others. Elements of these types are described in U.S. Pat. No. 4,895,790 (Swanson); U.S. Pat. No. 5,170,269 (Lin et al) and U.S. Pat. No. 5,202,775 (Feldman et al), which are hereby incorporated herein by reference.

Image reader may include an illumination assembly 142 for illuminating target area T. Illumination assembly 142 may also include one or more power supplies 144, illumination sources 146 and illumination optics 148.

Image sensor 154 may be a two dimensional array of pixels adapted to operate in a global shutter or full frame operating mode which is a color or monochrome 2D CCD, CMOS, NMOS, PMOS, CID, CMD, etc. solid state image sensor. This sensor contains an array of light sensitive photodiodes (or pixels) that convert incident light energy into electric charge. Solid state image sensors allow regions of a full frame of image data to be addressed. An exemplary CMOS sensor is model number MT9V022 from Micron Technology Inc.

Further description of image sensors is provided in commonly owned U.S. patent application Ser. No. 11/077,995 entitled "BAR CODE READING DEVICE WITH GLOBAL ELECTRONIC SHUTTER CONTROL" filed on Mar. 11, 2005, which is hereby incorporated herein by reference in it's entirety.

In a full frame (or global) shutter operating mode, the entire imager is reset before integration to remove any residual signal in the photodiodes. The photodiodes (pixels) then accumulate charge for some period of time (exposure period), with the light collection starting and ending at about the same time for all pixels. At the end of the integration period (time during which light is collected), all charges are simultaneously transferred to light shielded areas of the sensor. The light shield prevents further accumulation of charge during the readout process. The signals are then shifted out of the light shielded areas of the sensor and read out.

Features and advantages associated with incorporating a color image sensor in an imaging device, and other control features which may be incorporated in a control circuit are discussed in greater detail in U.S. Pat. No. 6,832,725 entitled "An Optical Reader Having a Color Imager" incorporated herein by reference. It is to be noted that the image sensor 154 may read images with illumination from a source other than illumination source 146, such as from a source located remote from the reader.

The output of the image sensor may be processed utilizing one or more functions or algorithms to condition the signal appropriately for use in further processing downstream, including being digitized to provide a digitized image of target T.

Microcontroller 160, may perform a number of functions, such as controlling the amount of illumination provided by illumination source 146 by controlling the output power provided by illumination source power supply 144. Microcontroller 160 may also control other functions and devices. An exemplary microcontroller 160 is a CY8C24223A made by Cypress Semiconductor Corporation, which is a mixed-signal array with on-chip controller devices designed to replace multiple traditional MCU-based system components with one single-chip programmable device. It may include configurable blocks of analog and digital logic, as well as programmable interconnects. Microcontroller 160 may include a predetermined amount of memory 162 for storing data.

The components in reader 112 may be connected by one or more bus 168 or data lines, such as an Inter-IC bus such as an I²C bus, which is a control bus that provides a communications link between integrated circuits in a system. This bus may connect to a host computer in relatively close proximity, on or off the same printed circuit board as used by the imaging device. I²C is a two-wire serial bus with a software-defined protocol and may be used to link such diverse components as the image sensor 154, temperature sensors, voltage level translators, EEPROMs, general-purpose I/O, A/D and D/A converters, CODECs, and microprocessors/microcontrollers.

The functional operation of the host processor 118 involves the performance of a number of related steps, the particulars of which may be determined by or based upon certain parameters stored in memory 166 which may be any one of a number of memory types such as RAM, ROM, EEPROM, etc. In addition some memory functions may be stored in memory 162 provided as part of the microcontroller 160. One of the functions of the host processor 118 may be to decode machine readable symbology provided within the target or captured image. One dimensional symbologies may include very large to ultra-small, Code 128, Interleaved 2 of 5, Codabar, Code 93, Code 11, Code 39, UPC, EAN, and MSI. Stacked 1D symbologies may include PDF, Code 16K and Code 49. 2D symbologies may include Aztec, Datamatrix, Maxicode, and QR-code.

Decoding is a term used to describe the interpretation of a machine readable code contained in an image projected on the image sensor 154. The code has data or information encoded therein. Information respecting various reference decode algorithm is available from various published standards, such as by the International Standards Organization ("ISO").

Operation of the decoding, which may be executed in a user or factory selectable relationship to a scanning routine, may be governed by parameters which are enabled for processing as a part of an autodiscrimination process, whether decoding is to be continuous or discontinuous, etc. Permitted combinations of scanning and decoding parameters together define the scanning-decoding relationships or modes which the reader will use. In the continuous mode (also referred to as continuous scanning mode, continuous streaming mode, streaming mode, fly-by scanning mode, on the fly scanning mode or presentation mode) the reader is held in a stationary manner and targets (such as symbols located on packages) are passed by the reader 112. In the continuous mode, the reader takes continuous image exposures seriatim and continuously decodes or attempts to decode some or all of these images. In the continuous mode exposure times and decoding times may be limited.

Discontinuous mode is a mode wherein scanning and/or decoding stops or is interrupted and initiated with an actuation event, such as pulling of a trigger 115, to restart. An exemplary utilization of the reader in discontinuous mode is via hand held operation. While triggered, the image reader may expose images continuously and decode images continuously. Decoding stops once the image reader is no longer triggered. Exposing of images however, may continue. In the discontinuous mode, the exposure time, decoding time out limits and decoding aggressiveness may be increased more than those set for continuous mode. The discontinuous mode is typically initiated because the operator knows a symbol is present. The decoder therefore may forego making a determination of the presence of a symbol because a symbol is presumed to be in the field of view. Discontinuous mode may provide longer range scanning than the continuous mode.

Switching between continuous and discontinuous modes may be accomplished by use of a trigger 115 located on the reader. For example, when the trigger is depressed by an operator the reader may operate in a discontinuous mode and when the trigger is released the reader may switch to continuous mode after a predetermined period of time. A scanning subroutine may specify an address buffer space or spaces in which scan data is stored and whether scanning is to be continuous or discontinuous. Another example of switching between continuous and discontinuous modes may be accomplished by symbology wherein switching between the modes depends on the type of symbology detected. The reader may stop attempting to decode a symbol after a predetermined time limit. The reader, may limit the type of symbols to decode when in the continuous mode.

The aiming pattern generator may be programmed to operate in either continuous or discontinuous modes.

In the continuous mode, the present device may be configured to automatically switch to a reduced power state if no symbol has been sensed for a period of time. Upon sensing of a symbol the scanner may then automatically switch back to the higher power state continuous mode. In this reduced power state the scanner may change from having the aimer and/or illumination light sources on for every scan to having either/or on for only some of the scans (e.g. every 2 or 3 or less scans). In this manner the system may still be in a position to sense the presence of a symbol, but will draw less current and also generate less internal heating. After sensing a symbol, the image reader may utilize aiming/illumination for every scan until another period of inactivity is sensed.

Mode changes may be accomplished by the host computer in response to an appropriate signal over either a direct connection or wireless connection to the scanner.

Specular reflection can be appreciated with the aid of FIG. 4a, wherein the reflecting surface is in the X-Y plane. Light incident upon a reflecting surface can be thought of as having polar angles of incidence θi, φi. The intensity of the reflected light will be non-zero only when viewed along the axis defined by the polar angles of θr, φr where θr=θi and φr=φi+π. Some of the incident light may also be absorbed at the surface or may penetrate into the surface such that the intensity of the reflected light may not be 100%. For this reason, the intensity of the reflected light will be equal to the intensity of the incident light multiplied by the reflection coefficient R where R is always equal to or less than 1. For a typical mirror, R can range from 80% to 95% while for a single glass to air or air to glass transition, R is typically on the order of 4%.

Specular reflection may be contrasted with a diffuse reflection (more typically termed scattering) illustrated in FIG. 4b, wherein the scattering surface is in the X-Y plane. Light incident upon a scattering surface can also be thought of as having polar angles θi, φi, however the scattered light now rather than all going in one direction, is scattered into the full hemisphere centered about the point of incidence. The intensity of the scattered light is typically a complex function of the angles of incidence, θi, φi and the scattering angles θs, φs., where scattered light rays have many different amplitudes and scattering angles. As with specular reflection, some of the light may also either penetrate the surface, be absorbed at the surface, or be specularly reflected. However in almost all instances the intensity of the scattered light will be much lower than that for any specularly reflected light because so much of the light will be scattered into directions other than at the specular angle.

The surface of many types of bar code symbols tend to have a shiny or specular surface causing a portion of the incident light from an image reader illumination source to be reflected back into receive optics. The intensity of this light may be significantly higher than the scattered light from the scattering surface of the indicia itself. The result is that the indicia may be locally obliterated by this specular reflection.

Figure 5:
FIG. 5 is a representation of specular reflection from an illumination system.

An example of this situation is shown in the image of FIG. 5 wherein a portion of the indicia is completely obliterated or masked by the brightness of the specular reflection. Although the example shown is for a bar code symbol, the specular reflections can also obliterate portions of an image that is used for other purposes, for example a photographic or video clip. This is commonly seen when taking flash assisted photographs of someone or something situated before a window or glass door.

This type of specular reflection is especially apt to occur when the reader is held such that the medial plane is perpendicular to the surface of the bar code symbol being scanned. This situation will be made more apparent with the aid of FIG. 6a-d showing a typical set of specular rays that reduce the functionality of a bar code scanning system because of specular reflection.

Figure 6A:
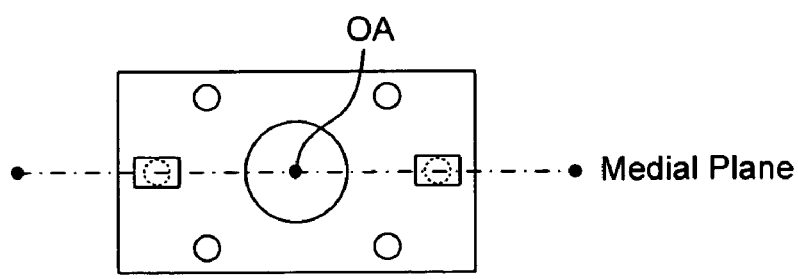
FIG. 6a is a schematic block diagram of a front view of a prior art optical reader system.

FIG. 6a illustrates a front view of a prior art imaging module adversely affected by specular reflection from a Region of Interest (ROI). The illumination modules provide illumination fields.

FIG. 6b illustrates a side view of the imaging module of FIG. 6a wherein an aimer light source is directed towards the ROI of a target. In exemplary configurations considered herein the aimer illumination sources are not operated during the exposure period of the image sensor and therefore the aimers do not necessarily contribute a specular reflection component derived from the ROI. However the aimer in other configurations may also become a source of specular reflection. It is to be noted that the figures all show a symmetry of components about both the medial plane and the optical axis of the receive system.

Referring to FIG. 6c, a side view illustrates a singular component, beam, or ray of light emanating from illumination sources which is specularly reflected off the ROI region of target T and returned through the receive optics to the image sensor.

Referring to FIG. 6d, a top view illustrates a singular component, beam, or ray of light emanating from illumination sources which is specularly reflected off the ROI region of target T and returned through the receive optics to the image sensor.

Figure 7A:
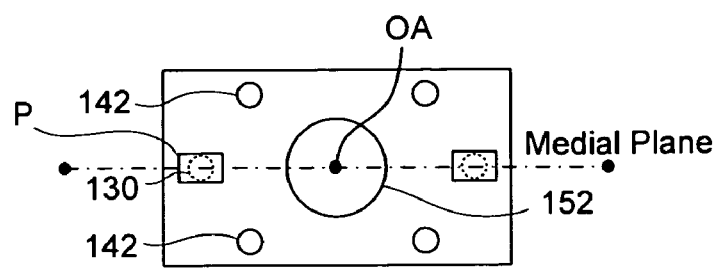
FIG. 7a is a schematic block diagram of a top view of an exemplary optical reader system in accordance with the present invention.

FIG. 7a illustrates a top view of an exemplary imaging module in accordance with the present invention having aimers 130, prisms P, illuminators 142, and an image sensor 152.

Figure 7B:
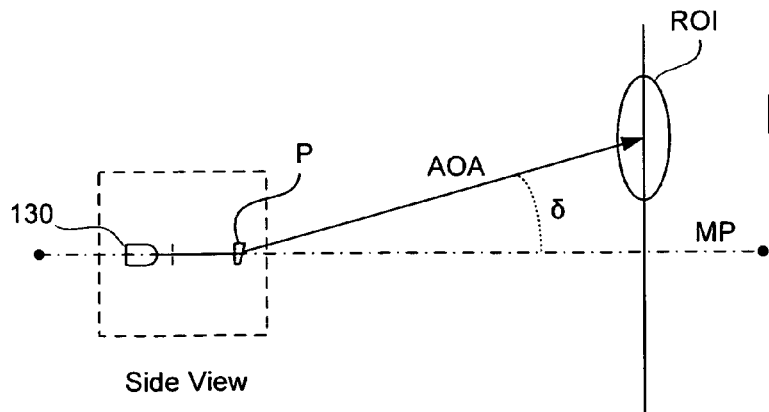
FIG. 7b is a schematic block diagram of a side view of an exemplary optical reader system illustrating an aiming light beam in accordance with the present invention.

FIG. 7b illustrates a side view of the imaging module of FIG. 7a wherein an aimer light source is directed generally towards the target. The aimer beam, or line, however, is shifted out of the medial plane by prism P such that the aiming beam or pattern is projected on the target outside the ROI. The aimer system has an optical axis defined by a line AOA. It may be seen that the AOA is directed out of the medial plane at an angle δ.

Figure 7C:
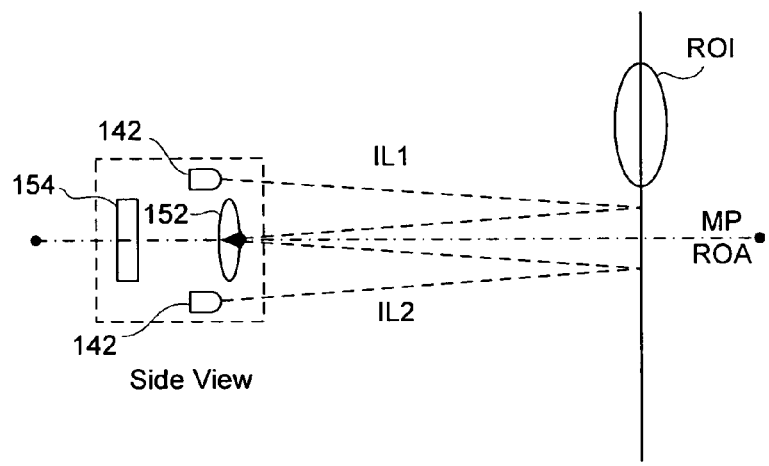
FIG. 7c is a schematic block diagram of a side view of an exemplary optical reader system illustrating single beam components of illumination light specularly reflected off a target outside a region of interest.

Referring to FIG. 7c, a side view illustrates dual component, beam, or ray of light emanating from illumination sources which are not specularly reflected off the ROI region of target T and returned through the receive optics to the image sensor.

Figure 7D:
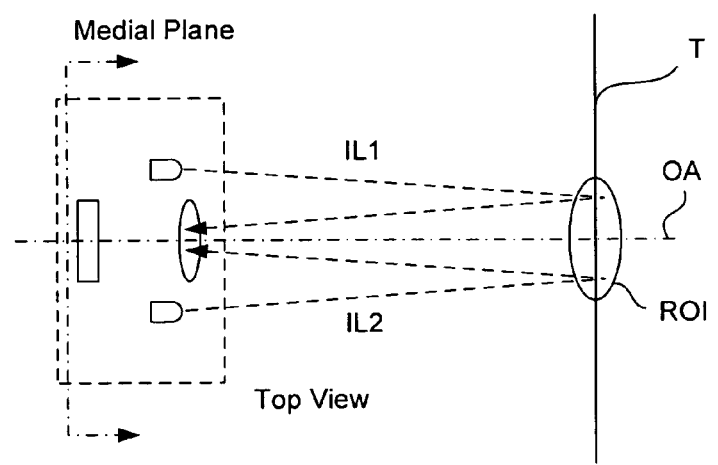
FIG. 7d is a schematic block diagram of a top view of an exemplary optical reader system illustrating single beam components of illumination light specularly reflected off a target outside a region of interest.

Referring to FIG. 7d, a top view illustrates dual component, beam, or ray of light emanating from illumination sources which are not specularly reflected off the target T. Illumination beams which previously specularly reflected from the ROI through the receive optics to the image sensor now specularly reflect outside the ROI.

When the operator holds the medial plane MP of the head portion of the imager approximately normal to the plane of the target and the reader is positioned such that the aiming pattern is positioned on the region of interest as illustrated in FIG. 7b, specular reflection from the light path or component illustrated in FIG. 7c will not originate from the region of interest. In this example, the aimer line is shifted out of the medial plane utilizing a prism P or lens. It can be seen that the receive optics optical axis ROA and aiming optical axis are not equi-angled to a normal of the plane of the target.

In exemplary configurations considered herein the aimer illumination sources are not operated during the exposure period of the image sensor and therefore the aimers do not necessarily contribute a specular reflection component derived from the ROI. However the aimer in other configurations may also become a source of specular reflection.

Figure 8A:
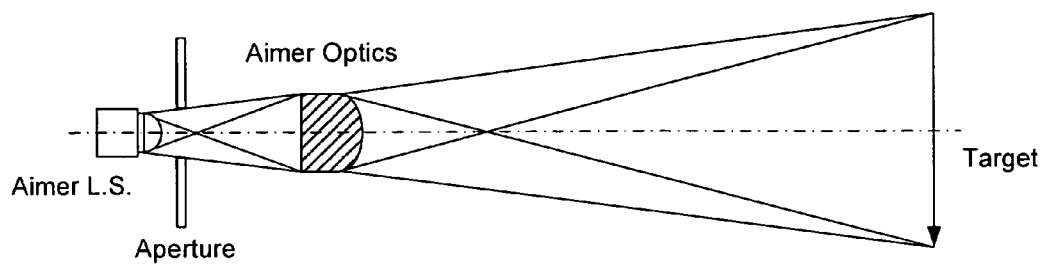
FIG. 8a is a schematic diagram of an aiming pattern generator system in accordance with the prior art.

FIG. 8a illustrates a schematic of an exemplary aimer configuration utilized in the prior art, wherein an aimer light source projects light through an aperture and optics to provide an aiming pattern onto a target to assist an operator in capturing an image of the target with an image sensor. The aimer light source projects light typically forward into a hemispherical pattern. The front surface of many LED light sources contains an integrated convex lens surface designed to reduce the angular divergence of the light leaving the LED. As much of this light as possible is directed through the aimer aperture and directed to further pass through the aimer optics. Optics are designed to create an image of the aimer aperture onto the indicia located in the target T.

Figure 8B:
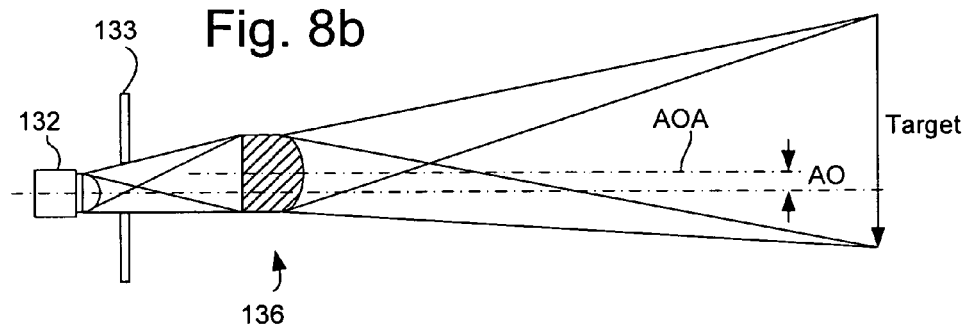

FIG. 8b illustrates a schematic of an exemplary aimer configuration, wherein an aimer light source 132 projects light through an aperture 133 and optics 136 to provide an aiming pattern onto a target to assist an operator in capturing an image of the target with image sensor by aligning the target with the field of view of the imaging sensor. In this example, optics 136 comprises a lens similar to the lens illustrated in FIG. 8a. The optical axis of the aimer light source 132 is offset to the optical axis of the aimer optics 136 a distance AO. The effect of providing such an offset is to cause the aiming pattern to be offset on the target T, which misaligns the aimer lens optical axis AOA of the receiving imager optics and imager sensor from the projected illumination pattern to thereby reduce or eliminate specular reflection into the imager sensor when the operator holds the medial plane of the head portion of the imager approximately normal to the plane of the target and places the aiming pattern on the target. In other words, the aimer light source and aimer optics are configured to motivate, induce, or prompt the operator to hold the reader at an angle or position to the target which eliminates specular reflection from the target reaching the sensor array when the operator projects the aiming pattern onto the target. In an example of this implementation, the prism was designed to offset the aimer pattern by an angle of on the order of 6 degrees.

Figure 8C:
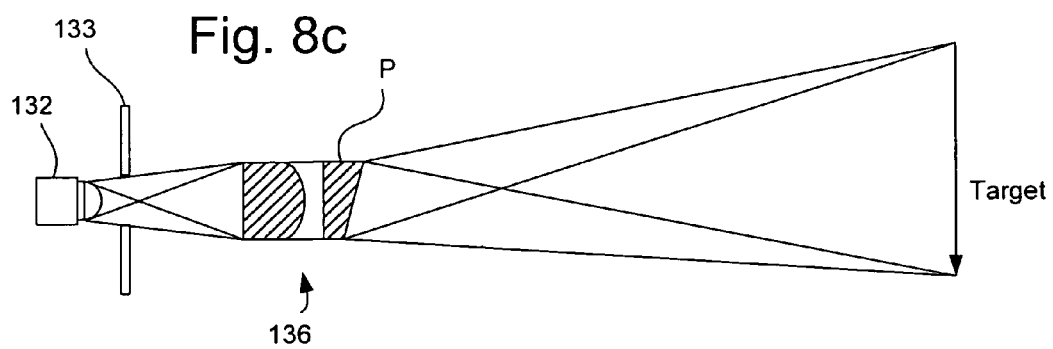

FIG. 8c illustrates a schematic of an exemplary aimer configuration, wherein an aimer light source 132 projects light through an aperture 133 and optics 136 to project an aiming pattern onto a target to assist an operator in capturing an image of the target with image sensor by aligning the target with the field of view of imaging sensor. In this example, optics 136 comprises a lens similar to the lens in FIG. 8a, and a prism P. Prism P refracts light from the aimer light source, the effect provided being that the aiming pattern projected on the target T is offset. This offset may motivate, induce, or prompt the operator to hold the reader at an angle or position to the target which eliminates specular reflection from the target reaching the sensor array when the operator projects the aiming pattern onto the target. In other words, when the aimer pattern is on the target T, the aimer lens optical axis AOA of the receiving imager optics and imager sensor is misaligned from the aimer pattern to thereby reduce or eliminate specular reflection into the imager sensor when the operator holds the medial plane of the head portion of the imager approximately normal to the plane of the target and places the aiming pattern on the target. Once the aiming pattern is redirected, an operator is induced to aim the reader so that the redirected aiming pattern is on the target, but the orientation of the image sensor with respect to the target is such that it is not receiving specular reflection from the target.

FIG. 8d illustrates a schematic of an exemplary aimer configuration, wherein an aimer light source 132 projects light through an aperture 133 and optics 136 to provide an aiming pattern onto a target to assist an operator in capturing an image of the target with image sensor by aligning the target with the field of view of imaging sensor. In this example, optics 136 comprises a singular lens having similar characteristics of the lens and prism combination illustrated in FIG. 8c.

FIG. 8e illustrates a schematic of an exemplary aimer configuration similar to the aimer configuration of FIG. 8a, but wherein the aimer system is tilted relative to the optical reader medial plane MP at an angle 'Ω.

FIG. 8f illustrates a schematic of an exemplary aimer configuration similar to the aimer configuration of FIG. 8a, but wherein only the aimer optics are tilted relative to the optical reader medial plane MP at an angle 'Ω.

FIG. 9a illustrates a schematic of an exemplary illumination configuration utilized in the prior art, wherein an illumination light source, (i.e. an LED) projects light through illumination optics to provide light onto a target to assure that there is adequate illumination at the bar code surface to assure the proper functioning of the imaging system for capturing an image of the target with the image sensor. An optical diffuser (which may be an integral part of the illumination optics) may be utilized to diffuse the LED light to assure an even light distribution over the bar code pattern being scanned. The details of such diffuser systems are described in U.S. Pat. No. 6,659,350 which is hereby incorporated herein by reference. LEDs of the type shown typically include an integrated lens to create a more optimal lights distribution pattern, thereby increasing the optical efficiency of the illumination system. Exemplary LEDs are model numbers HLMT-QG00 and HLMP-QM00 available from Agilent.

FIG. 9b illustrates a schematic of an exemplary illumination configuration wherein the illumination pattern is redirected out of the medial plane to be more optimally directed along the same axis as the reconfigured aimer pattern of this invention. This is accomplished by placing a prism P in the illumination light path, such as on the surface of the diffuser plate. The prism function may be divided between the front and the rear surface of the diffuser plate. A secondary lens 149 may be added to assist in the redistribution of the illumination light. The diverging LED light is made more convergent with lens 149.

FIG. 9c illustrates a schematic of an exemplary illumination configuration, wherein an illumination light source 146 projects light through optics 148 to provide an illumination pattern onto a target. In this example, optics 148 comprises a lens similar to the lens illustrated in FIG. 9a. The optical axis of the illumination light source 146 is offset to the optical axis of the illumination optics 148 a distance IO. This effectively causes the illumination pattern to be redirected out of the medial plane to be more optimally directed along the same axis as the reconfigured aimer pattern of this invention.

Figure 10:
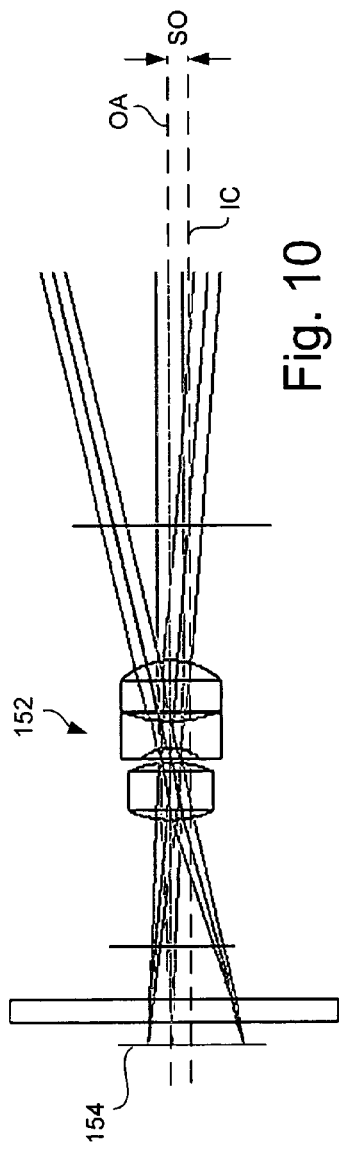
FIG. 10 is a block side view of an exemplary imaging sensor and imaging optics in accordance with the present invention.

FIG. 10 is a schematic representation of an exemplary optical reader, wherein the optical axis OA of the imaging optics 152 is offset from a centerline IC of the image sensor 154 by a distance SO. Centerline IC is a line through the center of the imager which is normal to the imager face. The effect of this offset is to direct the imager field of view in an upward direction to be directed parallel to the axis of the aimer as described with respect to previous illustrations. In this fashion the imager field of view is recentered about the shifted aimer centerline, thus optimizing the imager field of view.

Figure 11:
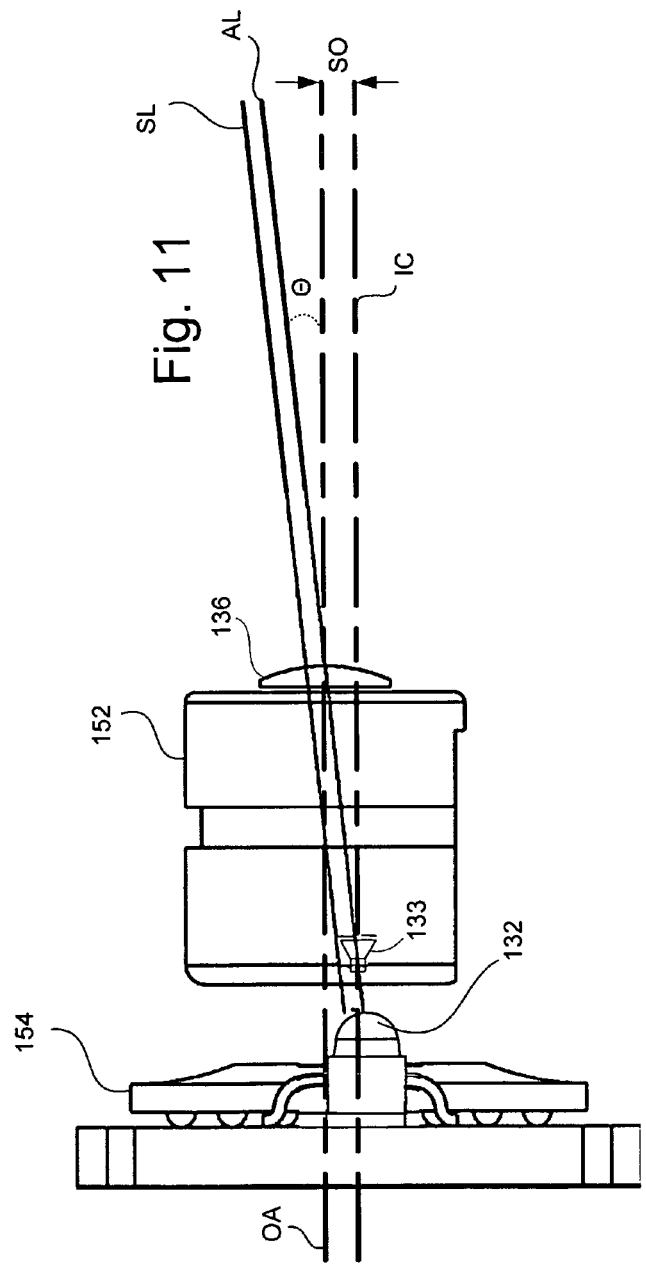
FIG. 11 is a side view of an exemplary imaging sensor, imaging optics, and aiming pattern light source in accordance with the present invention.

FIG. 11 is a schematic representation of an exemplary optical reader combining the features described above, wherein the optical axis OA of the imaging optics 152 is offset from or not coincident with the centerline IC of the image sensor 154 by a distance SO. The aimer focus lens 136 is also displaced to direct the aimer line or center of the aimer pattern AL at an angle Θ with OA. The aimer light source, sensor and lens are positioned so that a line SL emanating from the center of the image sensor through the center of the imaging optics is essentially parallel to AL but may not necessarily be coincident with AL.

Figure 12:
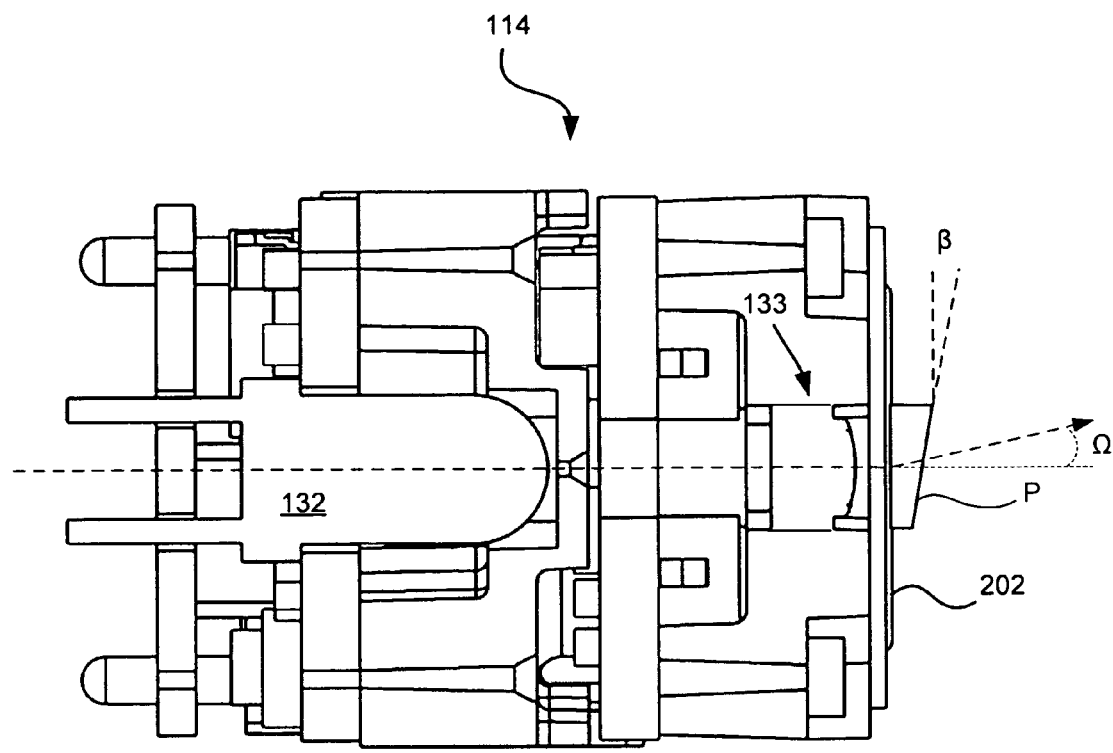
FIG. 12 is a cutaway side view of an exemplary imaging module in accordance with the present invention.

FIG. 12 is a diagram of an exemplary imaging reader assembly 114 having an aiming pattern light source 132 and aiming optics 133. The imaging reader assembly has an optical reader face 202. A lens or prism P is provided in front of the aiming optics to refract or redirect the aiming pattern at an angle of approximately 6 degrees from the medial plane. The prism P may be made of a glass (such as optical glass BK-7) with an angled face β having about an 11 degree angle. Note that the angles in the FIG. 12 are exaggerated in order to more clearly show the concept. Prism P may also be made of plastic such as acrylic with an appropriate redimensioning of the angle β. Once the aiming pattern is redirected, an operator is induced to aim the reader so that the redirected aiming pattern is on the target, but the resulting displacement of the image sensor with respect to the target is such that any specular reflection is not derived from the portion of the target being read.

Figure 13:
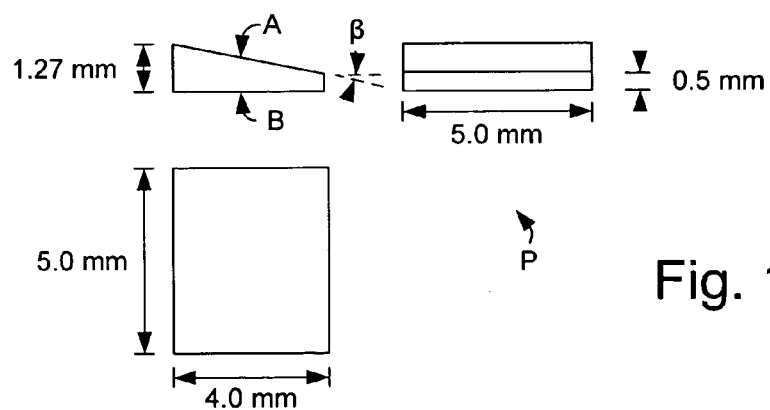
FIG. 13 is an illustration of three views of an exemplary aimer prism in accordance with the present invention.

FIG. 13 is an illustration of three views of an exemplary prism P in accordance with an exemplary embodiment present invention made of BK-7.

Figure 14:
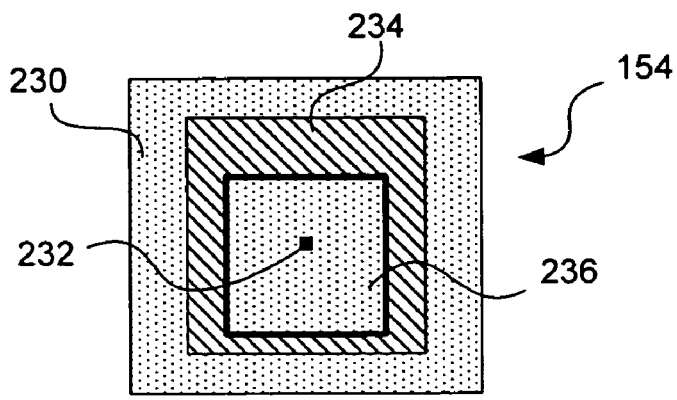
FIG. 14 is a representation of an exemplary image sensor in accordance with the present invention.

FIG. 14 is a schematic illustration of an exemplary image sensor 154 comprised of a sensor package 230 having a centerline 232. An image sensor die 234 may be provided in the sensor package with a sensor array 236 of pixels (which are exposed to light received from the target) disposed therein. In accordance with the present invention, the sensor array 236 centerline may be offset within the sensor package 230 to obtain similar results as shifting the sensor package when the sensor array is centered about the package.

Figure 15:
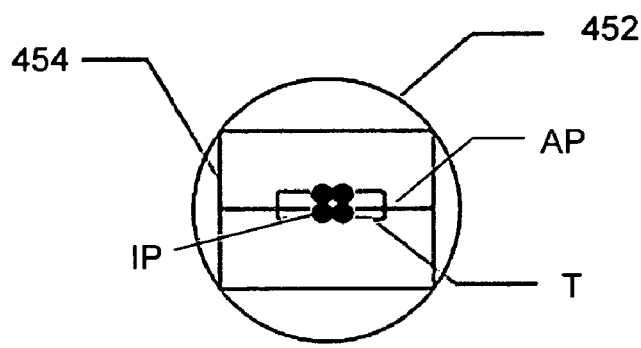
FIG. 15 is a representation of an exemplary image sensor, imager optics field of view, aiming pattern, illumination field and target in accordance with the present invention.

FIG. 15 is a schematic illustration of the image plane of the receive optics for an imaging system wherein the imager system medial plane is perpendicular to the target T. The circular field of view of the imaging lens as projected onto the image plane is represented by circle 452. The sensitive region of the image sensor is represented by the outline 454. In FIG. 15, the centerline of the image sensor is approximately centered about the optical axis of the imaging optics. One also observes an image of the aiming pattern AP as projected on the target T in order to facilitate the capture an image of the target. The image of the specularly reflected illumination pattern IP is projected symmetrically onto the imager. This specularly reflected illumination will preclude one from obtaining a proper decode in at least a portion of the bar code pattern imaged at location T.

Figure 16:
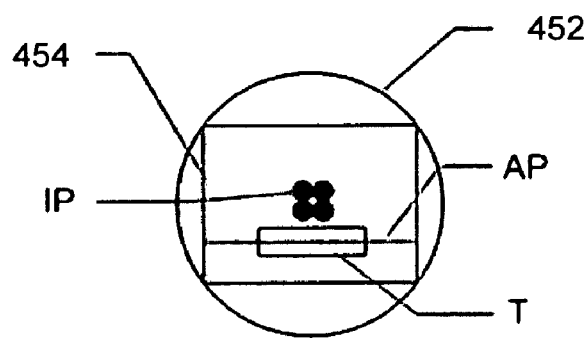
FIG. 16 is a representation of an exemplary image sensor, imager optics field of view, aiming pattern, illumination field and target in accordance with the present invention.

FIG. 16 is a schematic illustration of the image plane of the receive optics 152 for an exemplary imaging system implemented according to the invention. The circular field of view of the imaging lens as projected onto the image plane is represented by circle 452. The sensitive region of the image sensor 236 is represented by the outline 454. The centerline of the image sensor is approximately centered about the optical axis of the imaging optics. One also observes an image of the off axis aiming pattern AP as projected on the target T in order to capture an image of the target. Observe that in this figure while the scanner is still held with the medial plane perpendicular to the target T, the shifted aimer pattern AP has caused the operator to shift the scanner slightly downward in order to reposition the aimer pattern AP onto the target T relative to the position shown in FIG. 15. This has caused the image of the specularly reflected illumination pattern IP to no longer appear in the region T of the bar code pattern being scanner. In this fashion the effect of specular reflection has been mitigated. When observing these images, the receive optical system inverts the image. Thus moving the bar code scanning system of FIG. 15 in a downward direction will cause the image of the bar code pattern T to move in a downward direction. A similar result may be obtained if the operator rotates or tilts the scanner with respect to the plane of the target.

Figure 17:
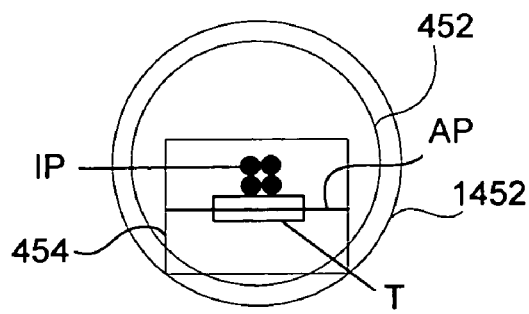
FIG. 17 is a representation of an exemplary image sensor, imager optics field of view, aiming pattern, illumination field and target in accordance with the present invention.

FIG. 17 is an exemplary system similar to the system illustrated in FIG. 16 except that the region of sensitivity 454 has been shifted in a downward direction relative to the field of view of the imaging lens 452 causing the bar code pattern of interest at region T to be again centered on the imager region of sensitivity 454. Observe that in this example a portion of the imager is outside the useful field of view of the imaging lens 452 because of vignetting. This can be corrected by utilizing a lens with a slightly larger field of view 1452.

Figure 18:
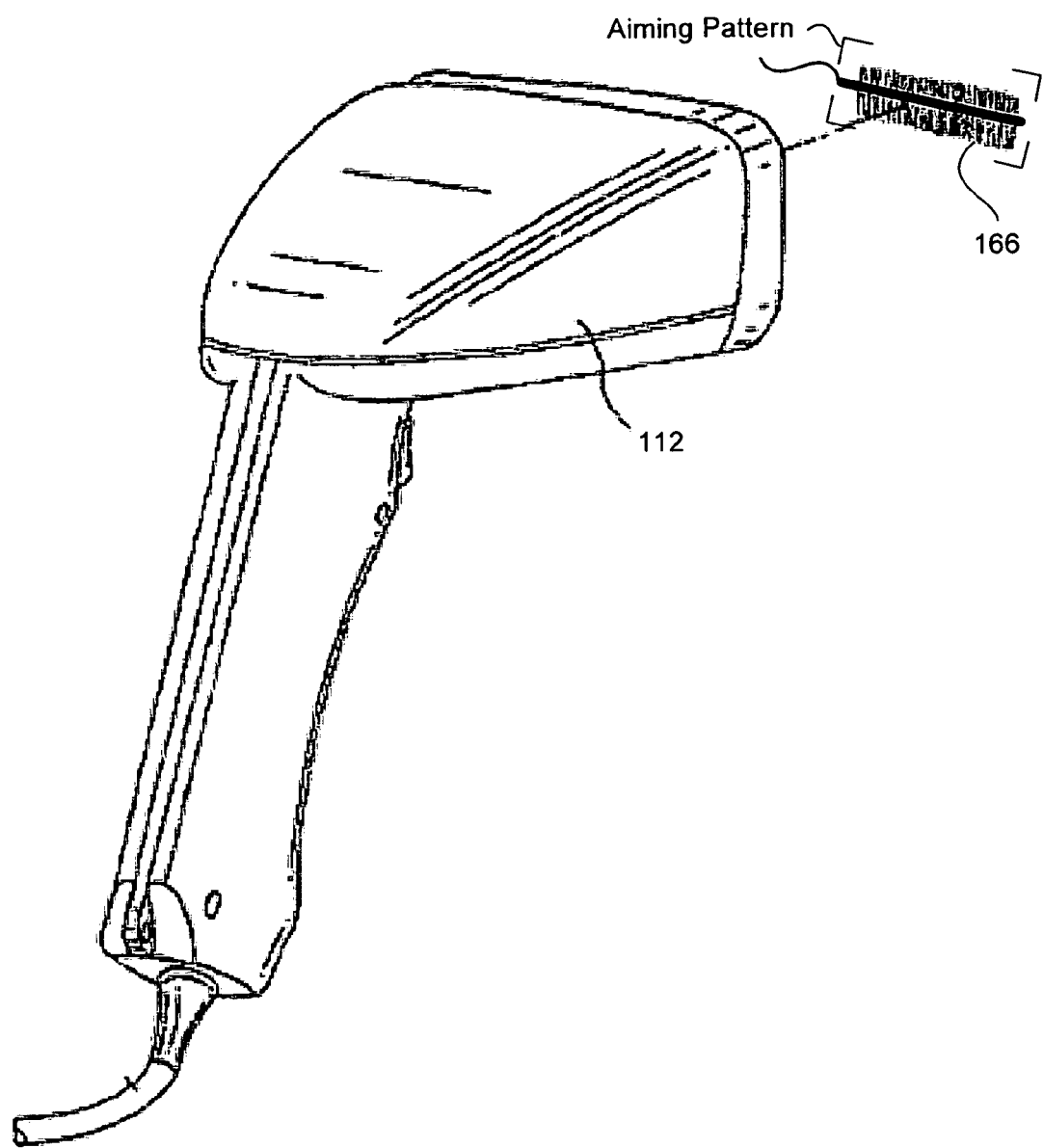
FIG. 18 is a perspective view of an optical reader directing an aiming pattern on a target.

FIG. 18 is an illustration of an exemplary optical reader directing an aiming pattern on a target.

Described herein is an optical reader comprising an image sensor array for converting light from a target into output signals representative thereof, the image sensor array having a centerline; a processor for decoding a machine readable symbology within the target derived from the output signals; and receive optics for directing light from the target to the image sensor, the optics having a receive optics optical axis, wherein the image sensor array and receive optics are configured such that the centerline is not coincident with the optical axis.

Described herein is an optical reader comprising: an image sensor array for converting light from a target into output signals representative thereof, the image sensor array having a centerline; a processor for decoding a machine readable symbology within the target derived from the output signals; receive optics for directing light from the target to the image sensor, the receive optics having a receive optics optical axis; an aiming light source for projecting an aiming pattern onto the target; and aiming optics for directing the aiming light onto the target off of the receive optics optical axis.

Described herein is an optical reader comprising: an image sensor array for converting light from a target into output signals representative thereof, the image sensor array having a centerline; a processor for decoding a machine readable symbology within the target derived from the output signals; receive optics for directing light from the target to the image sensor, the receive optics having a receive optics optical axis; an aiming light source for producing aiming light for projecting an aiming pattern onto the target; and aiming optics for directing the aiming light onto the target, the aiming optics having an aiming optical axis, wherein the receive optics optical axis and aiming optical axis are not equi-angled to a normal of the plane of the target.

It should be understood that the programs, processes, methods and apparatus described herein are not related or limited to any particular type of computer or network apparatus (hardware or software). Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa. The illustrated embodiments are exemplary only, and should not be taken as limiting the scope of the present invention. For example, the steps of the flow diagrams may be taken in sequences other than those described, and more, fewer or other elements may be used in the block diagrams. Also, unless applicants have expressly disavowed any subject matter within this application, no particular embodiment or subject matter is considered to be disavowed herein.

Alternate optical configurations to those drawn are also contemplated. Because many optically equivalent configurations can be created for the simple optical functions described herein, all these alternate embodiments are considered to be within the scope of the inventions described herein.

The invention claimed is:

1. An optical reader comprising:
   an image sensor array for converting light from a target into output signals representative thereof, the image sensor array having a centerline;
   a processor for decoding a machine readable symbology within the target derived from the output signals; and,
   receive optics for directing light from the target to the image sensor, the optics having a receive optics optical axis,
   wherein the image sensor array and receive optics are configured such that the centerline is not coincident with the optical axis at the time that the receive optic is directing light from the target to the image senor.

2. An optical reader in accordance with claim 1, further comprising an illumination source for illuminating the target, and wherein the configuration of the image sensor array and receive optics reduce specular reflection from the illumination source into the image sensor array.

3. An optical reader in accordance with claim 1, wherein the image sensor is operated in the global shutter mode.

4. An optical reader in accordance with claim 1, wherein the image sensor array is a complementary metal oxide (CMOS) image sensor.

5. An optical reader in accordance with claim 1, further comprising an aiming pattern generator for directing an aimer light beam onto the target, the aimer light beam being misaligned from the receive optics optical axis.

6. An optical reader in accordance with claim 1, further comprising an illumination source for illuminating the target and an aiming pattern generator for directing an aimer light beam onto the target in a manner such that when the aiming pattern is directed onto the target the receive optics optical axis is misaligned with specular reflection from the illumination source off of the target.

7. An optical reader comprising:
an image sensor array for converting light from a target into output signals representative thereof, the image sensor array having a centerline;
a processor for decoding a machine readable symbology within the target derived from the output signals;
receive optics for directing light from the target to the image sensor, the receive optics having a receive optics optical axis;
an aiming light source for producing aiming light for projecting an aiming pattern onto the target;
aiming optics for directing the aiming light onto the target, the aiming optics having an aiming optical axis;
wherein the receive optics optical axis and aiming optical axis are not equi-angled to a normal of the plane of the target.

8. An optical reader in accordance with claim 7, further comprising an illumination source for illuminating the target, and wherein the configuration of the image sensor array and receive optics reduce specular reflection from the illumination source into the image sensor array when the aiming pattern is projected on the target.

9. An optical reader in accordance with claim 7, wherein the image sensor is operated in the global shutter mode.

10. An optical reader in accordance with claim 7, wherein the image sensor array is a complementary metal oxide (CMOS) image sensor.

11. An optical reader in accordance with claim 7, further comprising an illumination source for illuminating the target and illumination optics for directing the illumination light onto the target misaligned with the receive optics optical axis.

12. A method of operating an optical reader comprising the steps of:
converting light from a target into output signals representative thereof with an image sensor, the image sensor array having a centerline;
decoding a machine readable symbology within the target derived from the output signals;
directing light from the target to the image sensor with receive optics, the receive optics having a receive optics optical axis,
configuring the image sensor array and receive optics such that the centerline is not coincident with any part of the receive optics optical axis at the time that light is directed to the image sensor by the receive optics.

13. A method in accordance with claim 12, wherein the configuring reduces specular reflection from the illumination source into the image sensor array.

14. A method in accordance with claim 12, wherein the image sensor is operated in the global shutter mode.

15. A method in accordance with claim 12, wherein the image sensor array is a complementary metal oxide (CMOS) image sensor.

16. A method in accordance with claim 12, further comprising directing an aimer light beam onto the target and misaligning the aimer light beam from the receive optics optical axis.

17. A method in accordance with claim 12, further comprising illuminating the target and directing an aimer light beam onto the target and misaligning the aimer light beam from the receive optics optical axis and specular reflection from the illumination source off of the target.

18. An optical reader for imaging a target disposed in a plane comprising:
an image sensor array for converting light from a target into output signals representative thereof, the image sensor array having a centerline;
a processor for decoding a machine readable symbology within the target derived from the output signals;
receive optics for directing light from the target to the image sensor, the optics having a receive optics optical axis;
the image sensor array and receive optics being disposed within a head portion of the optical reader, the head portion defining a medial plane wherein an operator holds the head portion such that the medial plane of the head portion is approximately normal to the target plane,
wherein the image sensor array and receive optics are configured such that the centerline is not coincident with any part of the optical axis at the time that the receive optic is directing light from the target to the image senor to thereby reduce specular reflection into the image sensor when the operator holds the medial plane approximately normal to the target plane.

19. An optical reader comprising:
an image sensor array for converting light from a target into output signals representative thereof, the image sensor array having a centerline;
a processor for decoding a machine readable symbology within the target derived from the output signals;
receive optics for directing light from the target to the image sensor, the receive optics having a receive optics optical axis;
an aiming light source for producing aiming light for projecting an aiming pattern onto the target;
aiming optics for directing the aiming light onto the target, the aiming optics having an aiming optical axis;
the image sensor array, aiming optics and receive optics being disposed within a head portion of the optical reader, the head portion defining a medial plane wherein an operator holds the head portion such that the medial plane of the head portion is approximately normal to the target plane,
wherein the receive optics optical axis and aiming optical axis are not equi-angled to the target plane to thereby reduce specular reflection into the imager sensor when the operator holds the medial plane approximately normal to the target plane.

* * * * *